May 8, 1923.

A. SILVENE ET AL 1,454,456

AIR BRAKE TRIPLE VALVE

Filed Dec. 12, 1921

Inventor
Antony Silvene.
Leonard B. Stedman.

By Fred G. Dieterich
Attorneys

May 8, 1923.
A. SILVENE ET AL
1,454,456
AIR BRAKE TRIPLE VALVE
Filed Dec. 12, 1921
2 Sheets-Sheet 2
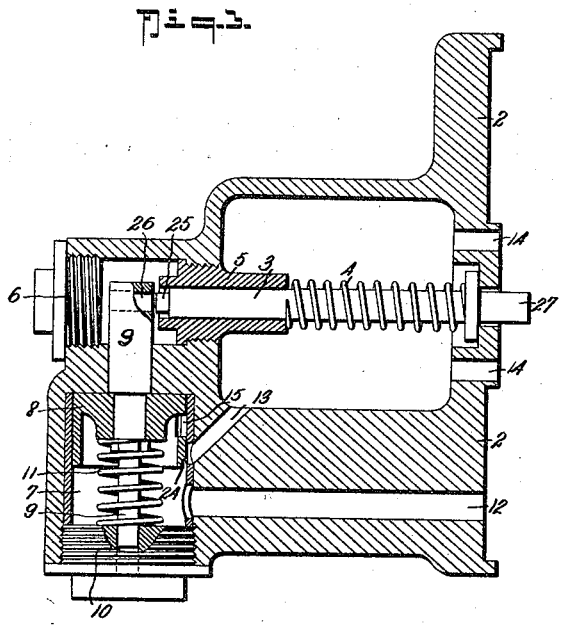
Inventor
Antony Silvene.
Leonard B. Stedman.
By Fred G. Dieterich
Attorneys Patented May 8, 1923.

1,454,456

UNITED STATES PATENT OFFICE.

ANTONY SILVENE AND LEONARD B. STEDMAN, OF VICTORIA, BRITISH COLUMBIA, CANADA.

AIR-BRAKE TRIPLE VALVE.

Application filed December 12, 1921. Serial No. 521,851.

*To all whom it may concern:*

Be it known that we, ANTONY SILVENE and LEONARD B. STEDMAN, citizens of the Dominion of Canada, residing at Victoria, in the Province of British Columbia, Canada, have invented certain new and useful Improvements in Air-Brake Triple Valves, of which the following is a specification.

This invention relates to an improvement in the triple valve of an air brake, and is designed to prevent any of the triple valve pistons of a train moving beyond the intended amount, as for example, for an ordinary brake application: That is to prevent any of the triple valves moving to the position of an emergency stop when an ordinary application is being made.

To make an ordinary application of the brake, whether merely to check the speed of the train or to make an ordinary stop, the engineer at his valve on the foot plate, makes a reduction of from eight to ten pounds in the air pressure of the train line pipe, with which reduction the piston of each triple valve is supposed to move a sufficient amount only to open its graduating valve and admit air from the auxiliary reservoir of each vehicle to its brake cylinder. After such an amount of air has passed from the auxiliary reservoir to the cylinder as will effect a reduction of the air pressure in that reservoir below that to which the train line pipe was reduced, the preponderating pressure of the air in the auxiliary reservoir moves the piston back and closes the graduating valve. Or in what is known as the quick service position of a "type K" or other quick action triple valve, a slight reduction of the pressure in the train line pipe moves the piston of the triple valve sufficient only to admit air from the train line pipe to the brake cylinder: Note that in neither case are the graduating stems of the triple valves supposed to be moved.

If an emergency stop is desired after either an ordinary or quick service application has been made as desired, the pressure in the main line pipe is reduced below that to which the air in the auxiliary reservoirs is reduced in fully charging the brake cylinders, in which case the triple valve piston cannot recoil to close communication to the brake cylinder and all available air pressure is admitted from the auxiliary reservoirs to the brake cylinders of the train.

In either case, if any of the triple valves of the train are defective as having weak graduating springs or being dry or dirty, such deflective valves will not respond properly to the reduction of pressure made. Those having weak graduating springs will move beyond that required to graduate their pistons, not being duly checked by their springs, and will move to the emergency position; while in the case of a dry or dirty triple valve the piston will not respond until a further reduction is made, and will then move suddenly and by its inertia move beyond the graduating to the emergency position.

It is to overcome these irregularities in the action of the triple valve pistons that the invention, which is the subject of this application, has been devised.

In general terms it comprises a means for locking the graduating stem, which locking is operative with the first movement of the piston, and thus secures each graduating stem against the further movement necessary to move it to the emergency position, until, by restoring the pressure in the train pipe, the lock is released and an emergency application of the brake may be made.

The invention is particularly described in the following specification, reference being made to the drawings by which it is accompanied, in which:

Fig. 3 shows a modification.

Figure 1:
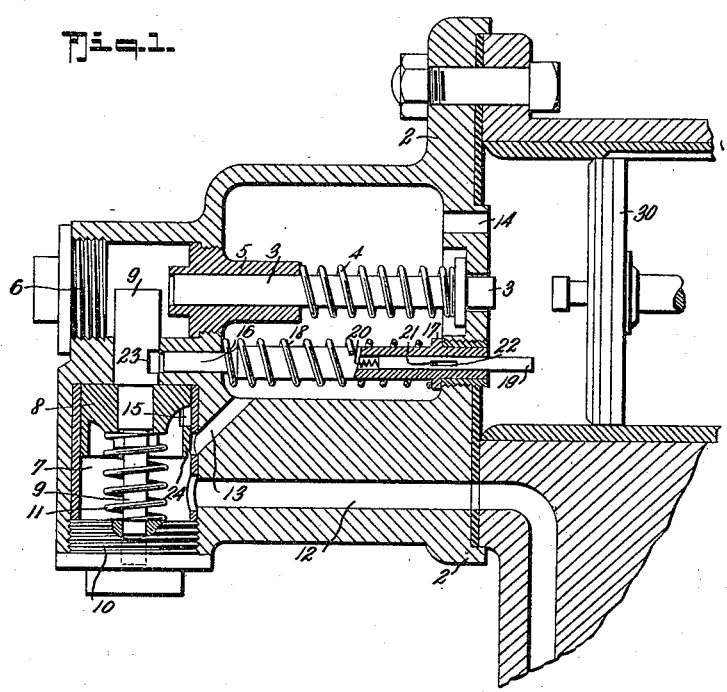
Fig. 1 is a longitudinal section of the cylinder cap of a triple valve to which this invention is applied.
Figure 2:
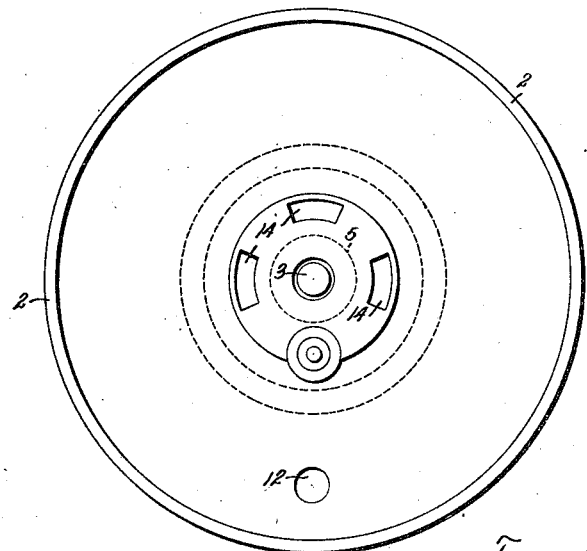
Fig. 2 is a face view of the cylinder cap as indicated by the arrow in Fig. 1.

In these drawings 2 represents the cylinder cap of a triple valve and 3 the graduating stem endwise movable therein against the resistance of its spring 4. The end bearing of this stem 3, instead of, as is usual, being formed in the end plug of the cap, is formed in a bushing 5, and the body of the cap 2 is produced beyond this bushing 5 and is closed by a plug 6, the end of the bushing 5 terminating near the end of the stem 3 when that stem is in its normal position.

Adjacent the end of the cap 2 is a bushed cylinder 7, the axis of which is normal to that of the stem 3 which it intersects in the space between the bearing 5 and the closing plug 6. In this cylinder 7 is endwise movable a piston 8 having secured in it an axial stem 9, the projecting end of which is squared to pass through a correspondingly squared aperture in the metal of the cap, and has also a bearing in the plug 10 which closes the lower end of the cylinder 7. A spring 11 normally holds this piston 8 at the limit of its movement toward the graduating stem 3, in which position the squared end 9 projects in the path of that stem and prevents movement of it beyond a certain defined limit.

A duct 12 connects the train pipe connection to the triple valve, with the space in the cylinder 7 beneath its piston 8, and a duct 13 connects the space within the cylinder 7 with that within the triple valve cap and therefrom through ducts 14 to the train pipe side of the triple valve piston. This duct 13, communicating with the train pipe side of the triple valve piston, is normally closed by the piston 8, but this piston has a port 15 cut in it which will register with the duct 13 when the piston 8 is moved downward against the resistance of its spring 11.

Between the inner end of the cylinder 7 and the axis of the graduating stem 3, a locking bolt 16 is slidably mounted with its axis parallel to the graduating stem 3. This bolt 16 has a collar 17 to bear against the end of the cap 2 and this collar also forms a seat for the end of the spring 18 by which the bolt is normally held with its collar 17 against the end of the cap 2, in which position the end of the bolt offers no obstruction to the free movement of the squared end 9 of the stem of the piston 8.

The locking bolt 16 is axially bored to receive a stem 19, the endwise movement of which is limited by a pin 21 through the bolt and through a slotted aperture 22 in the stem. Between the inner end of the stem and the end of the bore is a spring 20 by which the outer end of the stem is retained, projecting into the path of the triple valve piston 30.

The squared end 9 of the stem of the piston 8 is notched, as at 23, in a position opposite the end of the bolt 16 when the piston 8 is in its normal position in the path of the graduating stem 3.

When air is charged into the train pipe it passes through the duct 12 and through a limiting notch 24 in the lower ends of the piston 8, through the duct 13 to the space within the cap 2, and from there through the ducts 14 to the train pipe side of the triple valve piston 30. Therefrom in the ordinary way it moves that piston 30 to the limit of its movement and charges the auxiliary reservoir.

When a slight reduction of pressure is made in the train pipe to effect an ordinary application of the brake, that slight reduction is first experienced on the piston 8, but if insufficient to overcome the strength of the spring 11 of that piston, the piston 8 retains its normal position with the squared end 9 of its stem in the path of the end of the graduating stem 3 preventing endwise movement of that stem beyond its contact with 9.

The same reduction of pressure acting on the piston 30 of the triple valve causes that piston to move sufficient to open the graduating valve to deliver the required amount of air to effect an ordinary brake application, and simultaneously moves the locking bolt 16 through the strength of its spring 20 to project its end in to the notch 23 of the stem 9 and prevent movement of that stem. The triple valve is thus locked against any action to apply the brake beyond an ordinary application, even though a later reduction might be sufficient to overcome the strength of the spring 11 and move the piston 8. In other words a reduction of pressure sufficient to produce an ordinary application of the brake, locks the graduating stem 3 of the triple valve and prevents its piston 30 moving beyond what is necessary to effect that application.

If an emergency stop is desired the sudden reduction of pressure necessary to effect such an application being in excess of what can be relieved by what air can pass through the notch 24 of the piston 8, that piston will be moved down against the resistance of its spring 11, and the end 9 of its stem will be withdrawn from in front of the graduating stem 3 and its locking notch 23 from in front of the locking bolt 16; so that the triple valve piston 30 is free to make its full movement that its slide valve may uncover the port to the cylinder and the full pressure of the reservoir may be quickly available for the emergency stop desired.

In Figure 3 is shown a modified construction wherein the locking bolt 16 is dispensed with and movement of the graduating stem 3 will itself lock the stem 9 of the piston 8, the end of that stem 3 being reduced as at 25 to pass freely into an aperture 26 in the end of the stem 9 of the locking piston 8.

Where this modified construction is used, the end of the graduating stem 3 where it projects through the cap toward the piston 30 is lengthened as at 27 an amount equal to the shouldered reduction 25 at the other end where it enters the aperture 26 of the stem 9 of the locking piston 8.

With this modification the slight reduction of pressure in the train line pipe necessary to effect a service application, which reduction is insufficient to overcome the spring resistance of the locking piston 8, will move the piston 30 of the triple valve to admit air from the auxiliary reservoir to the brake cylinder, and in that movement will move the graduating stem 3 to lock the stem 9 in its position and prevent further movement of the graduating stem, in the same manner as the supplementary lock bolt 16 shown in Fig. 1.

The device works effectively to prevent the erratic action of the triple valves referred to in the preamble of this application, and ensures a light application of the brakes, whether to check the speed of a train down an incline or to effect an ordinary stop, to be uniformly applied to the vehicles of a train, and not, as at present, to have the brake properly applied on some vehicles while on others it is applied suddenly as in an emergency application, to the discomfort of the passengers, and injury to the rolling stock.

Having now particularly described our invention, we hereby declare that what we claim as new and desire to be protected in by Letters Patent, is:

1. In an air brake triple valve, means operative by a reduction of pressure in the train line pipe as for an ordinary brake application for locking the graduating stem and preventing movement of the triple valve piston beyond what is necessary to effect such ordinary application.

2. In an air brake triple valve, means operative by a slow reduction of pressure in the train line pipe, as for an ordinary brake application, for locking the graduating stem and preventing movement of the triple valve piston beyond what is necessary for such ordinary application.

3. In an air brake triple valve, having a graduating valve operative by the movement of the piston, means operative by a light reduction of air pressure in the train line pipe, as for an ordinary application of the brake preventing movement of the triple valve piston beyond what is necessary to open the graduating valve.

4. In an air brake triple valve, the combination with its graduating stem and the cap in which it is movable, of a cylinder in the cap the axis of which is radial to that of the graduating stem, a piston endwise movable in the cylinder, said piston having an axial projection from one end adapted to the limit of the piston's movement toward the stem to prevent movement of the stem beyond the desired limit, means for admitting air from the train line pipe to the cylinder of the cap whereby the piston is moved to the preventing position, a spring tending to hold it in that position, and means co-operating with movement of the triple valve piston for locking the locking piston in the locked position, and means whereby a sudden reduction of pressure in the train line pipe will move the piston from the preventing position.

5. In an air brake triple valve, the combination with its graduating stem, and the cap in which the graduating stem is movable, said cap having a cylinder, the axis of which is radial to that of the graduating stem, a piston endwise movable in the cylinder, said piston having an axial projection from one end adapted when the piston is at the limit of its movement toward the stem to prevent movement of that stem beyond a desired limit, means for admitting air from the train line pipe to the cylinder whereby the piston is moved to the position preventing movement of the stem, means permitting air to pass from the cylinder to feed the auxiliary reservoir of the triple valve, and means co-operative with movement of the triple valve piston under a reduction of pressure in the train line pipe for securing the locking piston in the preventing position.

6. In an air brake triple valve, the combination with its graduating stem and the cap in which it is movable, of a piston endwise movable in a cylinder formed in the cap the axis of which cylinder is radial to that of the graduating stem, a piston endwise movable in the cylinder, said piston having an axial projection from one end adapted at the limit of the piston's movement toward the stem to prevent movement of the stem beyond a desired limit, a spring normally holding the piston at the inner limit of its movement toward the stem, means for admitting air from the preventing piston cylinder to the triple valve when that piston is withdrawn from the preventing piston, and means co-operative with movement of the triple valve piston for locking the preventing piston in the preventing position when that piston is in that position.

In testimony whereof we affix our signatures.

ANTONY SILVENE.
LEONARD B. STEDMAN.